(12) United States Patent
Clift et al.

(10) Patent No.: US 8,878,997 B2
(45) Date of Patent: Nov. 4, 2014

(54) ELECTRONIC DISPLAYS HAVING PAIRED CANVASES

(71) Applicant: Sony Corporation, Tokyo (JP)

(72) Inventors: Graham Clift, Poway, CA (US); Brant Candelore, San Diego, CA (US); Kazumoto Kondo, San Diego, CA (US); Steven Richman, San Diego, CA (US); Fred Zustak, Poway, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/794,392

(22) Filed: Mar. 11, 2013

(65) Prior Publication Data

US 2014/0253802 A1 Sep. 11, 2014

(51) Int. Cl.
*H04N 5/445* (2011.01)
*H04N 5/44* (2011.01)

(52) U.S. Cl.
CPC .................. *H04N 5/4403* (2013.01)
USPC ........... 348/564; 348/565; 348/569; 348/580; 348/581; 348/585; 348/588; 348/598; 348/504; 348/509; 348/705; 348/716; 348/307; 348/423.1; 348/462; 725/41; 725/43; 725/45; 725/46; 725/40; 345/660; 345/667; 715/716; 715/717; 715/718; 715/719

(58) Field of Classification Search
USPC ......... 348/564, 565, 569, 580, 581, 585, 588, 348/598, 504, 509, 705, 716, 307, 423.1, 348/462; 345/660, 667; 715/716; 725/41, 725/43, 45, 46
See application file for complete search history.

(56) References Cited

U.S. PATENT DOCUMENTS

| | | | |
|---|---|---|---|
| 5,334,994 A | 8/1994 | Takagi | |
| 5,550,576 A | 8/1996 | Klosterman | |
| 5,682,207 A | 10/1997 | Takeda et al. | |
| 6,072,983 A | 6/2000 | Klosterman | |
| 6,204,887 B1 | 3/2001 | Hiroi | |
| 6,211,856 B1* | 4/2001 | Choi et al. | 345/666 |
| 6,493,038 B1* | 12/2002 | Singh et al. | 348/565 |
| 6,493,039 B1* | 12/2002 | Harrington | 348/618 |

(Continued)

FOREIGN PATENT DOCUMENTS

WO   WO2008137696   11/2008

OTHER PUBLICATIONS

Final office action from U.S. Appl. No. 13/794,386, mailed Apr. 7, 2014 (18 pgs.).

(Continued)

*Primary Examiner* — Jefferey Harold
*Assistant Examiner* — Mustafizur Rahman
(74) *Attorney, Agent, or Firm* — Fitch, Even, Tabin & Flannery LLP

(57) ABSTRACT

A visual display includes at least a first canvas configured to display a first session on the display and a second canvas configured to display a second session on the display. The first session includes first content received from a first content source and the second session includes second content having subject matter associated with the first content. The display includes a user agent configured to determine that the first content of the first session is associated with the second content of the second session and to pair the first and second canvases such that the first content and the second content are synchronized to each other.

22 Claims, 2 Drawing Sheets

(56) References Cited

U.S. PATENT DOCUMENTS

| | | |
|---|---|---|
| 6,700,625 B1 | 3/2004 | Fujii |
| 6,734,873 B1 | 5/2004 | Herf et al. |
| 6,885,406 B2 | 4/2005 | Yui et al. |
| 6,942,574 B1 * | 9/2005 | LeMay et al. ............... 463/41 |
| 7,119,849 B2 | 10/2006 | Yui et al. |
| 7,496,946 B1 | 2/2009 | Wehmeyer et al. |
| 8,166,399 B1 | 4/2012 | Amzallag et al. |
| 8,209,223 B2 | 6/2012 | Fink et al. |
| 8,276,182 B2 | 9/2012 | Wu et al. |
| 8,296,185 B2 | 10/2012 | Isaac |
| 8,495,697 B1 | 7/2013 | Goldfeder |
| 2001/0012020 A1 | 8/2001 | Stautner et al. |
| 2002/0069411 A1 * | 6/2002 | Rainville et al. ............ 725/37 |
| 2004/0019908 A1 | 1/2004 | Williams et al. |
| 2004/0196405 A1 * | 10/2004 | Spinelli ...................... 348/565 |
| 2005/0096125 A1 * | 5/2005 | LeMay et al. ............... 463/25 |
| 2005/0111549 A1 * | 5/2005 | Kim et al. ............ 375/240.12 |
| 2006/0154729 A1 * | 7/2006 | LeMay et al. ............... 463/42 |
| 2006/0190965 A1 * | 8/2006 | Lin et al. ..................... 725/46 |
| 2007/0135217 A1 * | 6/2007 | Litwin et al. ............... 463/40 |
| 2007/0174645 A1 * | 7/2007 | Lin ............................. 713/322 |
| 2007/0233879 A1 * | 10/2007 | Woods et al. .............. 709/227 |
| 2007/0237133 A1 * | 10/2007 | Woods et al. .............. 370/352 |
| 2007/0239819 A1 * | 10/2007 | Woods et al. .............. 709/201 |
| 2009/0144772 A1 | 6/2009 | Fink et al. |
| 2011/0009188 A1 * | 1/2011 | Adiraju et al. .............. 463/25 |
| 2011/0028203 A1 * | 2/2011 | Agarwal et al. ............. 463/20 |
| 2011/0173663 A1 | 7/2011 | Boudalier |
| 2011/0202828 A1 | 8/2011 | Wan |
| 2012/0151535 A1 | 6/2012 | Ramdeo |
| 2012/0227077 A1 | 9/2012 | Spivack et al. |
| 2012/0246685 A1 | 9/2012 | Fink et al. |
| 2012/0254729 A1 | 10/2012 | Wan |
| 2013/0047178 A1 | 2/2013 | Moon et al. |
| 2013/0063668 A1 * | 3/2013 | Yamashita et al. ......... 348/738 |

OTHER PUBLICATIONS

Non-final office action from U.S. Appl. No. 13/794,386, mailed Dec. 23, 2013 (19 pgs.).

* cited by examiner

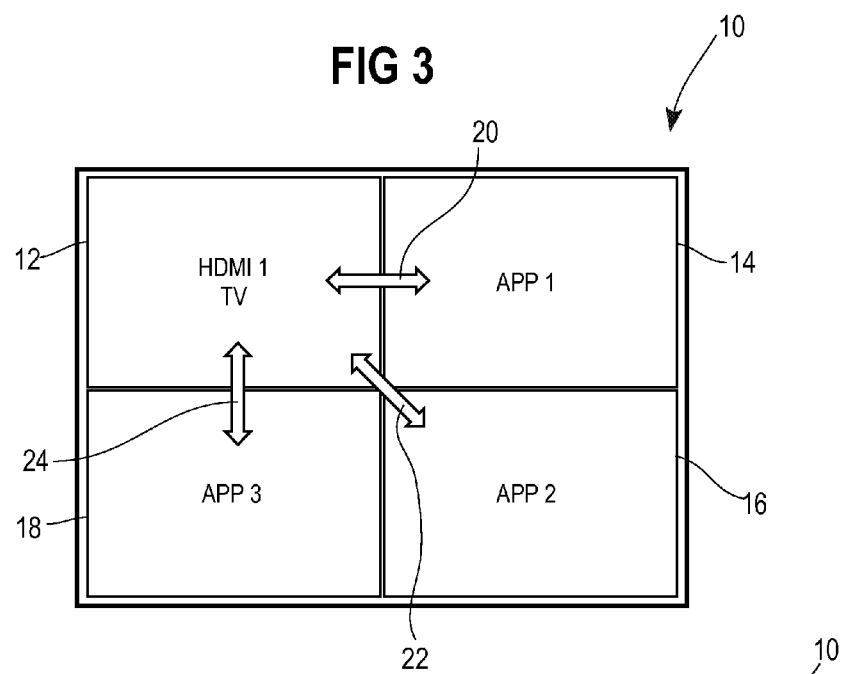
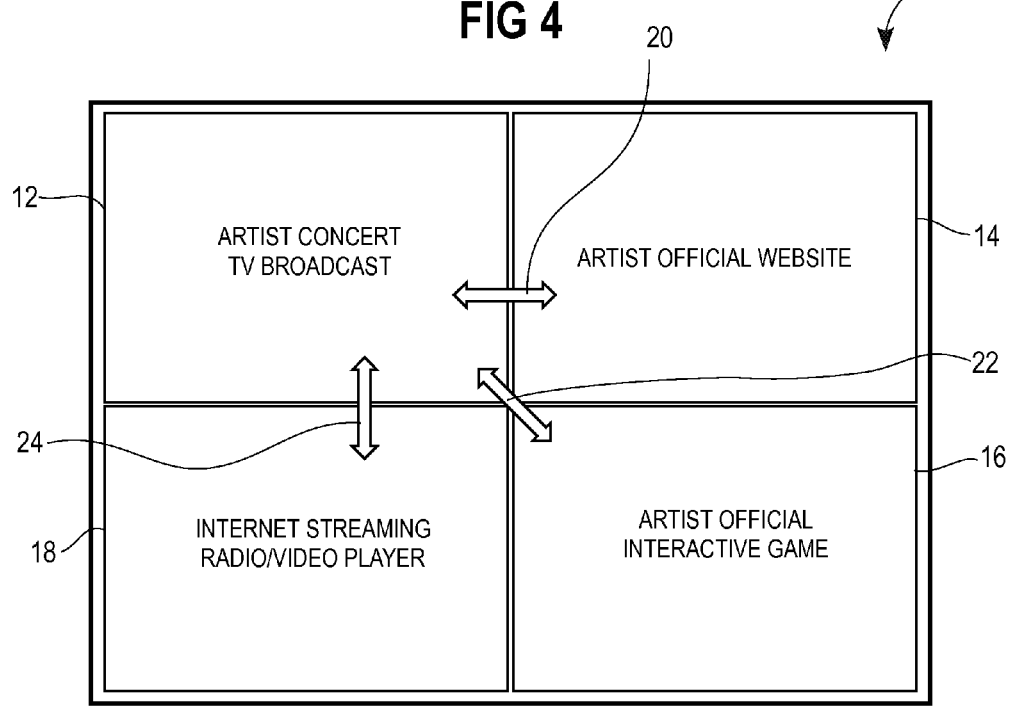

ELECTRONIC DISPLAYS HAVING PAIRED CANVASES

FIELD

This invention relates to electronic display screens, and more specifically, to display screens having one or more canvases that are linked to each other.

BACKGROUND

Big screen and Internet-enabled television sets are becoming increasingly popular because they may accommodate multiple canvases or windows that allow the users to simultaneously view and/or interact with multiple sources of content. For example, some televisions are provided with the picture-in-picture capability that allows a user to simultaneously display two different programs on the television screen. Monitors connected to computers running an operating system such as Windows or Mac OS may display multiple windows each having a different type of content. The windows are permitted to be independently controlled, moved, and resized on the computer monitors and may be tiled or positioned to overlay one another.

Televisions are typically controlled with a remote control and personal computers are typically controlled with a mouse and/or keyboard and each window on the display is controlled independently of the other windows on the display. The presently available televisions and monitors do not presently link or pair two or more of the windows on the screen such that the paired or linked windows are treated as being associated or related. Accordingly, a display is needed that provides the capability of linking or pairing one or more canvases based on the canvases having related or associated content for purposes of managing the canvases on the display in view of the pairings.

SUMMARY

The present invention satisfies this need. In one embodiment, a visual display includes a plurality of canvases. The display comprises a first canvas configured to display a first session on the display and a second canvas configured to display a second session on the display. The first session includes first content received from a first content source and the second session includes second content having subject matter associated with the first content. The first and second canvases are discrete and do not overlay one another on the display. The display further includes a user agent configured to determine that the first content of the first session is associated with the second content of the second session and to pair the first and second canvases such that the first content and the second content are synchronized to each other.

The second content may be received from the first content source, or may be received from a second content source separate from the first content source. The first content may be a program and the second content may be an Internet website.

In one approach, the second content is provided to the second canvas in response to a user interaction with the first content. In another approach, the second content is provided to the second canvas in response to a user selection of one of a hot spot and a link embedded in the first content. In yet another approach, the second content is provided to the second canvas in response to recognition of a portion of the first content and association of the second content with the portion of the first content.

The user agent may be configured to manage the first and second canvases according to the first and second canvases being paired to each other to each other.

In one approach, the visual display is a television and the first and second content of the first and second paired canvases is transferred from the visual display to a screen of another electronic device in communication with the display.

The user agent can be configured to permit one of the first and second canvases to output audio through a first audio source and another of the first and second canvases for outputting audio through a second audio source.

The user agent is configured to select audio of the first canvas as being dominant for the first audio source and audio of the second canvas as being dominant for the second audio source. The user agent may permit the user to switch audio output of the first and second canvases between the first and second audio sources. The user agent may permit the user to switch audio output of the first and second canvases between the first and second audio sources by positioning a cursor over one of the first and second canvases selected by the user for outputting audio through a user-selected one of the first and second audio sources. One of the first and second audio sources may be speakers internal to the display and another of the first and second audio sources may be wireless headphones.

In one approach, the user agent is configured to recognize one of the first and second sessions as a primary session and another one of the first and second sessions as a secondary session.

In another approach, the user agent is configured to direct the primary session to output audio through a primary audio source and direct the secondary session to output audio through a secondary audio source.

The display of claim 1, further comprising at least a third canvas configured to display a third session including third content.

In one approach, the third canvas is not paired by the user agent to the first and second canvases based on recognition by the user agent that the third content is not associated with the first content or the second content.

In an approach, the first canvas is increased in size such that one of the second and third canvases no longer fits on the display and the user agent resizes the third canvas such that the third canvas is no longer visible on the display due to the third canvas not being paired to the first canvas and resizes the second canvas such that the second canvas remains visible on the display due to the second canvas being paired to the first canvas.

A method of linking at least two canvases on a display comprises: providing a first canvas on the display, the first canvas configured to display a first session including first content received from a first content source; providing a second canvas on the display, the second canvas configured to display a second session including second content, the second content having subject matter associated with the first content, the first and second canvases not overlaying one another on the display; providing the display with a user agent configured to manage at least the first and second canvases; determining, by the user agent, that the first content of the first session is associated with the second content of the second session; and pairing, by the user agent, the first and second canvases such that the first content and the second content are synchronized to each other.

The methods described in the present application provide numerous advantages over the presently used systems and methods, which will be appreciated by those of ordinary skill in the art with reference to the following drawings, detailed description, and claims.

BRIEF DESCRIPTION OF THE DRAWINGS

FIG. 3 is a schematic diagram of a display screen of an electronic visual device showing four canvases receiving content from four distinct sources and one of the canvases being paired with three other canvases; and FIG. 4 is a schematic diagram of a display screen of the electronic visual device of FIG. 3, showing four exemplary types of content displayed on the four canvases and one of the canvases being paired with one other canvas.

DETAILED DESCRIPTION

Reference will now be made in detail to the present preferred embodiments of the invention, examples of which are illustrated in the accompanying drawings.

Generally, a visual display comprises a first canvas configured to display a first session on the display and a second canvas configured to display a second session on the display. The first session includes first content received from a first content source and the second session includes second content having subject matter associated with the first content. The display further includes a user agent configured to determine that the first content of the first session is associated with the second content of the second session and to pair the first and second canvases such that the first content and the second content are synchronized to each other.

Figure 1:
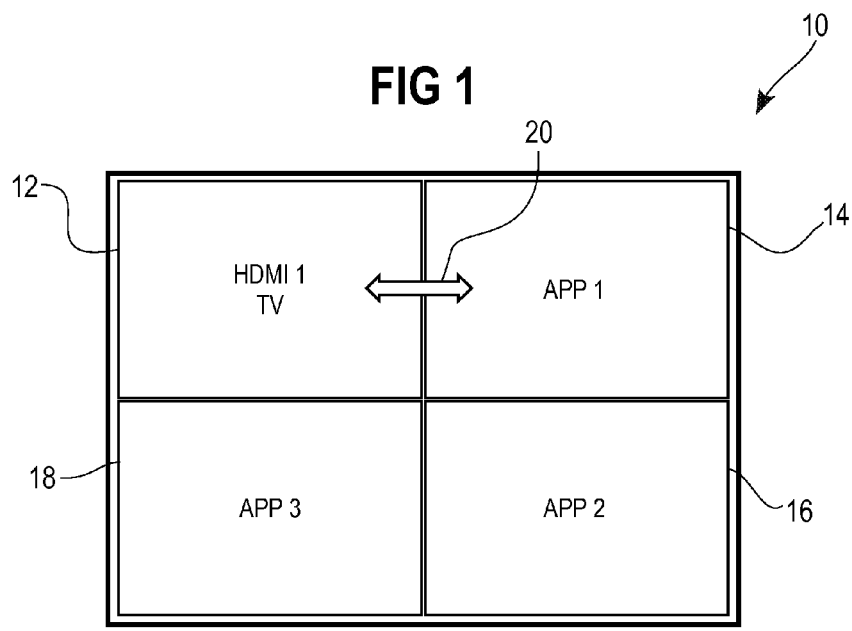
FIG. 1 is a schematic diagram of a display screen of an electronic visual device showing four canvases receiving content from four distinct sources and one of the canvases being paired with one other canvas.

With reference to FIG. 1, an exemplary visual display 10 includes several canvases 12, 14, 16, and 18 available to one or more users to enjoy various different functionalities on the display 10. As shown by way of example in FIG. 1, the first canvas 12 may represent a first session that includes content received from a television programming broadcasting source, such as a cable head end or an earth station of a satellite television service provider. In one approach, the first canvas 12 receives content from a set top box that receives the television broadcast from a cable head end and is connected to the visual display 10 via an HDMI port. The second, third, and fourth canvases 14, 16, and 18 have been shown in FIG. 1 as displaying APP 1, APP 2, and APP 3, respectively, but the canvases 14, 16, and 18 are not limited to receiving and displaying "applications." By way of example only, the canvases 12, 14, 16, 18 may simultaneously and independently represent sessions including different types of content and content received from one source or four different sources. For instance, each of the canvases 12, 14, 16, and 18 may independently display live television programming, video-on-demand movies, Internet content such as a browser and web pages, streaming radio/video content, interactive games (via a local CD-ROM or hard drive or from a game server), JAVA applications, or the like services.

An exemplary suitable electronic display 10 may be in the form of an electronic device such as a television, computer monitor, tablet computer, a mobile communication device, or the like. The display 10 may be an LCD, LED, OLED, or plasma television display having HD (1920×1080), 4K (3840×2160), or 4K2K (4096×2160) resolution. The electronic display 10 has been shown in FIGS. 1-3 as having four discrete non-overlapping canvases 12, 14, 16, and 18, but it will be appreciated that the display 10 can have any number of canvases suitable for the size of the display 10. For example, an 84 inch display may include four canvases as shown in FIG. 1, a 120 inch display may include six or eight canvases, and a 360 inch display may include 9, 16, or 25 canvases.

Each of the canvases 12, 14, 16, and 18 of the display 10 allows for dynamic, scriptable rendering of shapes and bitmap images. For example, the canvases 12, 14, 16, and 18 may be used in building graphs, animations, games, and image composition, rendering video content, and/or other such content. In some implementations, the canvases 12, 14, 16, and 18 represent a low level, procedural model that updates a bitmap and does not have a built-in scene graph. In one approach, the canvases 12, 14, 16, and 18 are utilized with HTML5. In some implementations, a canvas 12, 14, 16, 18 consists of a drawable region defined in HTML code with dimension attributes. Code may access the area through a set of drawing functions similar to those of other common two-dimensional APIs, which can allow for dynamically generated graphics. In some approaches, the code can be JavaScript code or other relevant code. The canvases 12, 14, 16, 18 may be raster-based and distinct from the vector-based scalable vector graphics (SVG) often used in website content to display graphics and/or drawings.

The display 10 may include a software-implemented event manager, client, or user agent such as a browser user agent. The user agent may be in the form of software or a browser agent stored in the memory of the display 10, a set-top box, a gaming console, a media player device, or a remote server, and configured to receive user inputs, preferences, settings, and templates that govern relative sizes, locations, and priorities of the canvases 12, 14, 16, 18 on the display 10. For example, the user agent may be in the form of one or more browser windows and/or provide an icon-based selection menu on the display 10 that permits the user to enter inputs, preferences, and/or settings via a remote control or a touch screen interface.

As shown in FIG. 1, the canvases 12, 14, 16, and 18 are distinct from one another. The canvases 12, 14, 16, and 18 are positioned on the screen of the display 10 such that the canvases 12, 14, 16, 18 do not overlay or occlude one another. In one approach, the display 10 is configured such that the canvases 12, 14, 16, and 18 are prevented from occluding any portion of one another. For example, the display 10 is adapted such that when one of the canvases (e.g., 12) is resized, the other three of the canvases (e.g., 14, 16, and 18) are automatically resized accordingly. In one approach, the first canvas 12 may be increased in size by a user via a remote control (not shown) and, in response to the first canvas 12 being resized, one, two, or all of the other canvases 14, 16, and 18 are reduced in size to accommodate for the size increase of the first canvas 12.

When a user watching television programming shown on the canvas 12 desires to increase the size of any one of the canvases, in particular, the canvas 12, the user may resize the canvas 12 using a remote control, mouse, keyboard, touch screen controls, or the like. Since the user agent 20 is preferably set to prevent the canvases 12, 14, 16, 18 from overlaying or occluding one another in whole or in part, as the canvas 12 is increased in size to a point where the canvas 12 would overlay any of the canvases 14, 16, and 18, the user agent is 20 is configured to automatically resize one or more of the canvases 14, 16, 18 on the display 10 in real time to accommodate for the increase in the size of the canvas 12. This provides an advantage over existing displays, which may permit the display of multiple windows where each window may be independently resized but do not automatically resize the windows when one window is resized, requiring a user to expend time and effort to manually resize each of the windows to an appropriate size.

In one exemplary approach, a user may select user agent menu options requiring that the canvases 12, 14, 16, and 18 are tiled and equally sized whenever the display 10 is turned on, or that only canvases 12, 14 are visible on the display 10 and regardless of the resizing and positioning of the canvases 12 and 14, that canvas 12 is always larger than canvas 14 and will be always on the left of canvas 14. With such options set by the user, the user agent manages the canvases 12, 14, 16, 18 such that no matter how the canvases 12, 14, 16, 18 are resized or moved on the display 10, the canvas 12 remains larger than the canvas 14 and is located on the left of the canvas 14.

In one preferred form, the user agent may pair one or more of the canvases 12, 14, 16, 18 on the screen of the display 10 and manage two canvases on the display 10 based on the two canvases being paired to each other. For example, the user agent may recognize two canvases 12 and 14 as being paired based on the content displayed on the canvases 12 and 14. In one approach, the content (e.g., a television or video program) running and displayed on the canvases 12 and 14 may include one or more markers that permit automatic content recognition. Such markers may be video content or audio content-specific.

By way of example, one or more portions of the video or audio content on the canvases 12 and 14 may be transmitted by the user agent to a remote server where such portions are analyzed to determine if they are associated (e.g., by the content provider or the network) with each other or other related or linked content. The remote server may then transmit the results of the content recognition analysis back to the user agent and the canvases 12 and 14 may be paired as indicated by a double arrow 20 in FIG. 1 based on a determination that the content of the canvases 12 and 14 is associated. It will be appreciated that the user agent may be configured to analyze such portions of the content on the canvases 12 and 14 directly without transmitting them to a remote server for content recognition analysis. It will also be appreciated that a user may manually set the user agent to recognize the canvases 12 and 14 as having associated content and manage the canvases 12 and 14 as a pair. In a preferred form, the user agent may be configured to synchronize the content displayed on paired canvases. For example, as a football game is displayed on the canvas 12, a box score may be launched on the paired canvas 14 that is updated in real time synchronously with the progress of the game, or a companion football video game may be launched on the paired canvas 14.

Upon recognition of the canvases 12 and 14 as a pair, the user agent may manage the canvases 12 and 14 differently from the unassociated canvases 16 and 18. In one approach, the user agent may manage the canvases 12, 14, 16, and 18 such that the paired or linked canvases 12 and 14 are larger than any of the other canvases 16 and 18, and both remain visible on the screen of the display 10 whenever any one canvases 12, 14, 16, 18 are resized to a size where one or more of the other canvases can no longer fit on the screen of the display 10. The user agent may also be configured to maintain a preset size ratio between the paired canvases 12 and 14.

Associated content may be content that is related by subject matter. For example, a user watching one football game on the canvas 12 may be presented with a real time box score of the game or a touchdown scored in another football game on the paired canvas 14. Alternatively, the user may be presented with a targeted e-commerce opportunity or advertisement on the paired canvas 14. In another alternative, the content on the canvas 12 may include embedded web links, interactive overlays, hot spots, and/or icons that are selectable by a user using a remote control, a mouse, or a keyboard, and the selecting of which generates content associated with the selected web link, overlay, hot spot, or icon on the paired canvas 14.

The user agent may be set up such that the paired or linked canvases 12 and 14 have equal priority. In such a scenario, the user agent may be configured to maintain the canvases 12 and 14 to be the same size whenever any of the canvases 12, 14, 16, or 18 is resized. Alternatively, the user agent may be configured such that one of the paired canvases (e.g., canvas 12) is associated with a higher priority than the other (e.g., canvas 14) of the paired canvases. In such a scenario, the user agent may maintain the canvas 12, due to its higher priority setting among the paired canvases 12 and 14, as always being the larger of the two paired canvases. In another alternative, the user agent may be configured such that the paired canvases 12 and 14 are associated with a higher or lower priority than the other canvases 16 and 18. In such a scenario, the user agent may maintain the paired canvases 12 and 14 as being larger or smaller than the other canvases 14 and 16 based on whether the paired canvases 12, 14 have higher or lower priority than the other canvases 16, 18.

The display 10 has size limit and a pixel number limit. If one of the canvases 12, 14, 16, 18 is increased in size beyond a certain predetermined point, the user agent may remove one or more of the canvases 12, 14, 16, 18 from view on the display 10. Due to the canvases 12 and 14 being paired to each other as indicated by the double arrow 20 in FIG. 1, if the size of the canvas 12 is increased such that the user agent determines that one of the remaining canvases can no longer be displayed in a size that is viable for viewing by a user, the user agent of the display 10 may remove one of the canvases 16, 18 unpaired to the canvas 12, but will retain the canvas 14 on the screen of the display 10 due to its pairing to the canvas 12.

Similarly, if a canvas (e.g., canvas 16) not paired to the canvases 12 or 14 is increased such that the user agent determines that one of remaining canvases 12, 14, 18 can no longer be displayed in a size that is viable for viewing by a user, the user agent of the display 10 may remove either the canvas 18, or both of the canvases 12, 14, but will not remove one of the paired canvases 12, 14 while retaining the other of the paired canvases 12, 14 on the screen of the display 10. If one or more of the canvases 12, 14, 16, 18 are removed from view on the display 10, the removed canvas or canvases may remain resident in the internal (e.g., cache) memory of the display 10 until a time when the user decides to restore such canvas or canvases to be visible again on the display 10. For example, the user may press a button on a remote control to direct the user agent to restore the canvas or canvases on the display 10.

The paired canvases 12 and 14 may output audible sounds associated with the first and second content, respectively, simultaneously via two or more different audio output sources. For example, sound associated with the content displayed on the canvas 12 may be reproduced from speakers built into or connected to the display 10 and sound associated with the content displayed on the canvas 14 is reproduced from wireless headphones in communication with the display 10.

In one approach, the user agent recognizes one of the two paired canvases 12 and 14 as having the dominant or primary audio output and the other of the two paired canvases 12 and 14 has having the secondary audio output. For instance, if the display 10 is only provided with one audio output source in the form of built in speakers, the default setting of the user agent would be to output only audio associated with the canvas 12 through the speakers. In one form, the user agent is configured to recognize one of the canvases 12 and 14 as dominant for sound output when a user positions a cursor over the respective canvas. Similarly, if the display 10 is provided with two audio output sources, for example, built in speakers and wireless headphones, the canvas 12 may be dominant for the built in speakers and the canvas 14 may be dominant for the wireless headphones and the user agent may be configured to permit a user to switch which of the canvases 12, 14 is dominant for which of the audio sources by positioning a cursor over a respective one of the canvases 12, 14 associated with the respective audio source.

In one approach, the first and second paired canvases 12 and 14 may be copied or transferred from the display 10 to a screen of another electronic device in communication with the display 10. By way of example only, the display 10 may be a big screen television set and the other electronic device may be a personal laptop computer, and a user leaving the house may transfer the canvases 12 and 14 as a pair, or one or both of the other canvases 16, 18 from the display 10 onto the screen of the laptop computer so that the user or the user's child can continue watching the television show or cartoon while away from home. It will be appreciated that instead of a personal laptop computer, the canvases 12, 14 may be transferred to any other suitable electronic device such as a tablet computer or a cellular phone.

Figure 2:
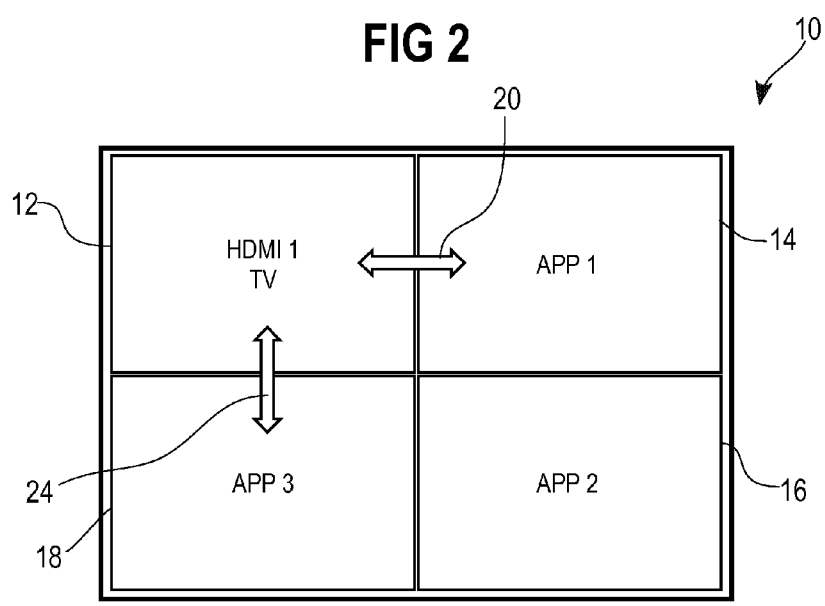
FIG. 2 is a schematic diagram of a display screen of an electronic visual device showing four canvases receiving content from four distinct sources and one of the canvases being paired with two other canvases.

FIG. 2 shows an alternative embodiment of the display 10 where the canvas 12, instead of being paired with only one other canvas 14, is paired with two other canvases 14 and 16. In FIG. 2, the pairing of the canvases 12 and 14 is indicated by the double arrow 20 and the pairing of the canvases 12 and 18 is indicated by the double arrow 24. In this embodiment, the canvases 12, 14, and 16 are managed by the user agent as paired or linked canvases in accordance with the principles described above. For example, in this embodiment, if one of the paired canvases 12, 14, 18 is increased in size beyond a certain predetermined point, the user agent may remove only one (non-paired) canvas 18 from view on the display 10, but will retain the paired canvases 12, 14, 18 on the screen of the display 10.

FIG. 3 shows an alternative embodiment of the display 10 where the canvas 12, instead of being paired with only one other canvas 14, is paired with the other canvases 14, 16, and 18 on the display 10. In FIG. 2, the pairing of the canvases 12 and 14 is indicated by the double arrow 20, the pairing of the canvases 12 and 14 is indicated by the double arrow 22, and the pairing of the canvases 12 and 18 is indicated by the double arrow 24. In this embodiment, the canvases 12, 14, 16, 18 are managed by the user agent as paired or linked canvases. One example of this embodiment is shown in FIG. 4, wherein the canvas 12 displays a television broadcast of a certain music artist or group, the paired canvas 14 displays an Internet browser displaying the official web page of the artist or group, the paired canvas 16 displays an interactive game sponsored by the artist or group, and the paired canvas 18 displays an internet streaming radio or video player that may permit the user to listen to another song by this artist or group through a different audio output.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

The invention claimed is:

1. A visual display comprising:
   a display screen including a plurality of canvases;
   a first canvas configured to display a first session on the display screen, the first session including first content received from a first content source;
   a second canvas configured to display a second session on the display screen, the second session including second content having subject matter associated with the first content, the first and second canvases being discrete and not overlaying one another on the display screen; and
   a user agent configured to determine that the first content of the first session is associated with the second content of the second session and to pair the first and second canvases on the display screen such that the first content and the second content are synchronized to each other.

2. The display of claim 1, wherein the second content is received from the first content source.

3. The display of claim 1, wherein the second content is received from a second content source separate from the first content source.

4. The display of claim 1, wherein the first content is a program and the second content is an Internet website.

5. The display of claim 1, wherein the second content is provided to the second canvas in response to a user interaction with the first content.

6. The display of claim 5, wherein the second content is provided to the second canvas in response to a user selection of one of a hot spot and a link embedded in the first content.

7. The display of claim 1, wherein the second content is provided to the second canvas in response to recognition of a portion of the first content and association of the second content with the portion of the first content.

8. The display of claim 1, wherein the user agent is further configured to manage the first and second canvases according to the first and second canvases being paired to each other.

9. The display of claim 1, wherein the visual display is a television and the first and second content of the first and second paired canvases is transferred from the visual display to a screen of another electronic device in communication with the display, and displayed on the screen of the other electronic device in communication with the display.

10. The display of claim 1, wherein the user agent is configured to permit one of the first and second canvases to output audio through a first audio source and another of the first and second canvases for outputting audio through a second audio source.

11. The display of claim 10, wherein the user agent is configured to select audio of the first canvas as being dominant for the first audio source and audio of the second canvas as being dominant for the second audio source.

12. The display of claim 10, wherein the user agent permits the user to switch audio output of the first and second canvases between the first and second audio sources.

13. The display of claim 12, wherein the user agent permits the user to switch audio output of the first and second canvases between the first and second audio sources by positioning a cursor over one of the first and second canvases selected by the user for outputting audio through a user-selected one of the first and second audio sources.

14. The display of claim 10, wherein one of the first and second audio sources is speakers internal to the display and another of the first and second audio sources is wireless headphones.

15. The display of claim 1, wherein the user agent is configured to recognize one of the first and second sessions as a primary session and another one of the first and second sessions as a secondary session.

16. The display of claim 15, wherein the user agent is configured to direct the primary session to output audio through a primary audio source and direct the secondary session to output audio through a secondary audio source.

17. The display of claim 1, further comprising at least a third canvas discrete from the first and second canvases and non-overlaying relative to the first and second canvases and configured to display a third session including third content.

18. The display of claim 17, wherein the third canvas is not paired by the user agent to the first and second canvases based on recognition by the user agent that the third content is not associated with the first content or the second content.

19. The display of claim 18, wherein the first canvas is increased in size such that one of the second and third canvases no longer fits on the display screen, the user agent resizes the third canvas such that the third canvas is no longer visible on the display screen due to the third canvas not being paired to the first canvas and resizes the second canvas such that the second canvas remains visible on the display screen due to the second canvas being paired to the first canvas.

20. A method of linking at least two canvases on a display screen of a visual display, the method comprising:
providing a first canvas on the display screen, the first canvas configured to display a first session including first content received from a first content source;
providing a second canvas on the display screen, the second canvas configured to display a second session including second content, the second content having subject matter associated with the first content, the first and second canvases not overlaying one another on the display screen;
providing the visual display with a user agent configured to manage at least the first and second canvases;
determining, by the user agent, that the first content of the first session is associated with the second content of the second session; and
pairing, by the user agent, the first and second canvases on the display screen such that the first content and the second content are synchronized to each other.

21. The display of claim 1, wherein the user agent is configured to automatically resize at least the second canvas in response to a determination by the user agent that a user resized the first canvas.

22. The display of claim 1, further comprising at least third and fourth canvases discrete from the first and second canvases and non-overlaying relative to the first and second canvases and configured to display third and fourth sessions including third and fourth content, respectively, wherein the user agent is configured to determine that the first content of the first session is associated with the second, third, and fourth content and to pair the first, second, third, and fourth canvases on the display screen such that the first, second, third, and fourth canvases show associated content on the display screen.

* * * * *